United States Patent [19]

van Driest

[11] 4,362,997

[45] Dec. 7, 1982

[54] QUADRIPHASE DIFFERENTIAL DEMODULATOR

[75] Inventor: Hans van Driest, Bilthoven, Netherlands

[73] Assignee: NCR Corporation, Dayton, Ohio

[21] Appl. No.: 217,942

[22] Filed: Dec. 18, 1980

[51] Int. Cl.³ ............................................. H04L 27/22
[52] U.S. Cl. ...................................... 329/50; 329/105; 329/122; 329/126; 375/85; 375/106; 375/120
[58] Field of Search ................. 329/50, 104, 105, 110, 329/122, 124, 126; 375/84-86, 106, 111, 118-120

[56] References Cited

U.S. PATENT DOCUMENTS 4,301,417 11/1981 Jansen et al. .......................... 329/50

Primary Examiner—Siegfried H. Grimm
Assistant Examiner—Edward P. Westin
Attorney, Agent, or Firm—J. T. Cavender; Wilbert Hawk, Jr.; Richard W. Lavin

[57] ABSTRACT

A method and apparatus for synchronizing a digital data demodulator to a received phase modulation carrier signal in which the carrier signal is phase shifted during each modulation period of the carrier to represent one of four pairs of binary bits or dibits. A first dibit clock is adjusted to the phase of a reference dibit clock whose output is used to synchronize the demodulator in establishing the location of the modulation period of the incoming carrier. In order to overcome errors found in the decoding of the carrier signal, the adjustment of the dibit clock is suppressed when the dibits 00 and 10 are being decoded. With this construction, it was found that the dibit clock may run out of synchronization if long strings of zero characters (dibits 00) are received. In order to solve this problem, a second dibit clock is employed which is adjusted on dibits 00. After a predetermined number of continuous 00 dibits have been decoded, the suppression of the adjustment to the first dibit clock is removed and the phase corrections applied to the second dibit clock are applied to the first dibit clock.

12 Claims, 11 Drawing Figures

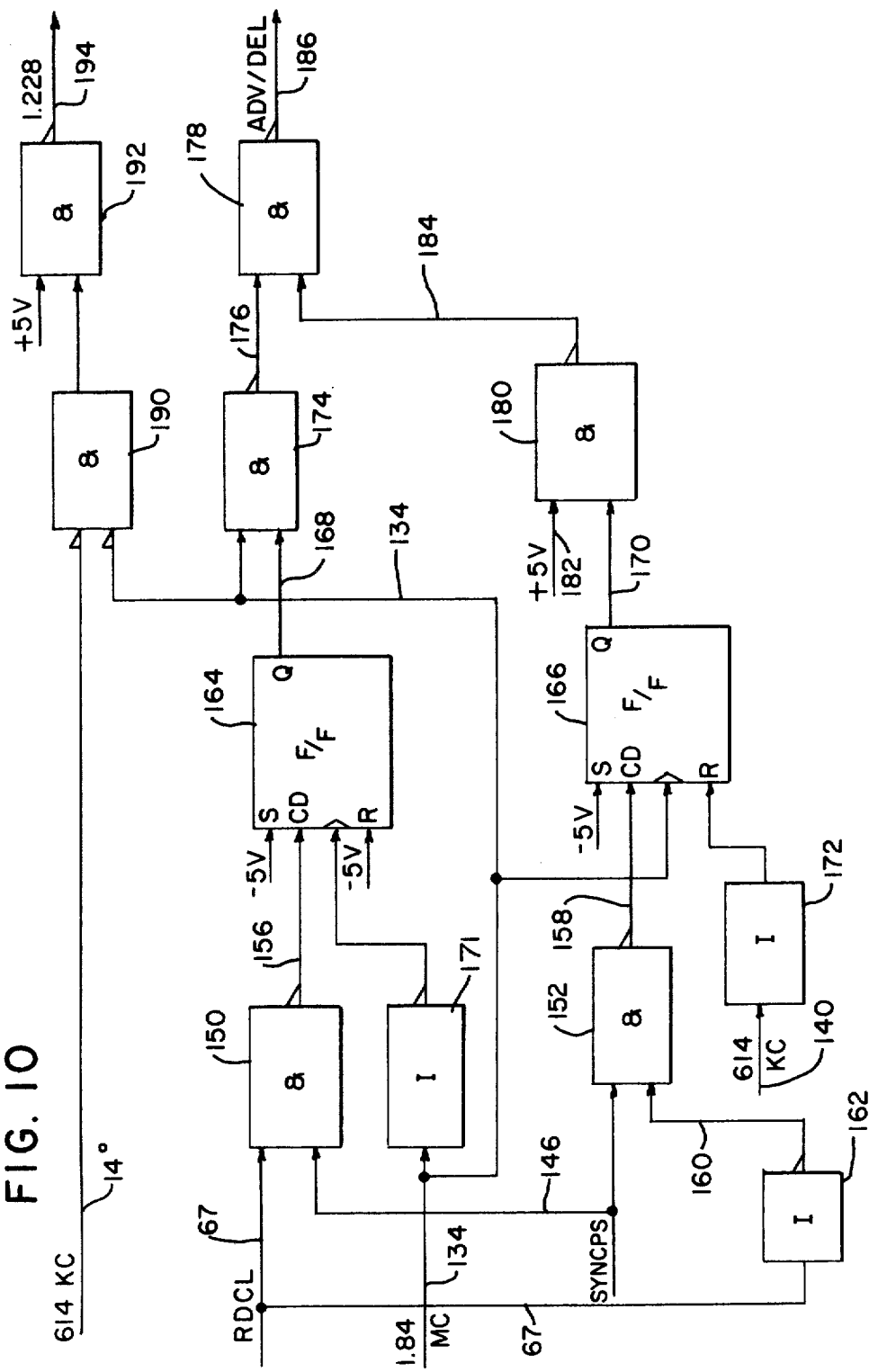

QUADRIPHASE DIFFERENTIAL DEMODULATOR

BACKGROUND OF THE INVENTION

This invention relates to the demodulation of differentially encoded quadriphase transmissions and more specifically, to improved demodulation thereof.

In a communication system using quadriphase transmissions, information desired to be transmitted is impressed upon a carrier signal of a given frequency by effecting predetermined phase shifts in a carrier signal corresponding to the information to be transmitted. The transmission of this carrier signal is characterized as the differentially encoded quadriphase transmission which transmits four possible information words with each word consisting of two binary bits referred to hereinafter in this application as "dibits". Differentially encoded quadriphase transmission transmits each word as a given increment in phase relative to the absolute phase of the preceding transmitted word.

In utilizing demodulators for the above-cited differentially encoded quadriphase transmissions, the demodulator determines the phase increments of the received signal and decodes the binary data from these phase increments. These phase increments are detected utilizing a reference signal. The received signal and a 90 degrees phase shifted receive signal are then multiplexed with the reference signal and a signal representing the reference signal shifted by 90 degrees. The resulting signals are fed into a plurality of integrators having an integration period equal to the period of one reference signal to obtain the detected I (in-phase) and Q (quadrature) signals from which the phase difference can be determined and proper coherent demodulation can then occur. Due to the quality of the transmission line or the like, the quality of the transmission signals deteriorate to the point that the recovery of the data transmitted is very low.

In demodulating synchronous, differentially coherent, four phase data transmission, the modulation interval or period during which the phase of the carrier frequency is altered must be determined. This period is used in establishing the modulation rate of the incoming data transmission. In addition, a dibit clock located in the receiver is synchronized with this modulation rate to establish a time frame for use in the demodulation operation. The demodulating process involves establishing a pseudo-carrier which is phase locked to the incoming carrier. This pseudo-carrier is phase locked by detecting the average phase position of the carrier over successive modulation intervals. The pseudo-carrier not only tracks the frequency of the carrier but assumes a stable phase position which can be used to establish the most probable location of the four possible carrier phases of each modulation interval. Once the phase position reference is established, the incoming carrier is investigated at each modulation interval to determine which of the four phase positions it most closely approximates. The approximated phase position is then assigned and stored as a reference for the next interval. The assigned phase position indicates the phase change and the proper two bit binary number or dibit which is then outputted as data to a receiving terminal. It is apparent that if an error is made in the assigned phase position, a false reference is established for the next interval. In generating the modulation rate, a reference oscillator is compared in a phase lock loop whose input is the modulation rate of the incoming signal and which adjust the phase of the reference oscillator to the phase of the modulation rate. As disclosed in the copending U.S. Application Ser. No. 129,797, filed Mar. 12, 1980, in the names of Jansen et al. now U.S. Pat. No. 4,301,417 and assigned to the assignee of the present application, it was found that in transmitting data consisting of long series of the dibits 00 and 10, the demodulator failed to decode the data due to the delay and amplitude distortion found in telephone lines. In order to overcome this problem, the application disclosed circuitry which suppressed the operation of the phase lock loop during the occurrence of the dibits 00 and 10, thereby eliminating or drastically reducing the decoding failure rate. Where long strings of the dibits 00 and 10 were transmitted, it was found that the circuit disclosed in the above-cited U.S. Application failed to provide the required synchronization necessary for a valid decoding operation. It is therefore an object of the present invention to provide a novel and improved data demodulator apparatus. It is a further object of this invention to provide a data demodulator apparatus which includes a timing and synchronization circuit which corrects for any deterioration of the quality of the transmission signal in which a long string of a predetermined dibit is involved.

SUMMARY OF THE INVENTION

These and other objects of the invention are fulfilled by providing a correction circuit in which the suppression of the correction of the phase lock loop is eliminated after a predetermined number of the dibits 00 have been received. Included in the circuit is an up/down counter which is set at a predetermined value and then incremented whenever the dibits 11 or 01 are processed and decremented when the dibits 00 or 10 are processed. Upon counting down to zero indicating that a predetermined number of the dibits 00 or 10 have been processed, a signal is generated which disables the suppression circuit affecting the correction to the phase lock loop, thereby allowing the phase lock loop to be corrected on the processing of any subsequent dibits 00.

BRIEF DESCRIPTION OF THE DRAWING

The foregoing and various other objects, advantages and meritorious features of the present invention will be apparent from the following detailed description and appended claims when read in conjunction with the drawings, wherein like numerals identify corresponding elements.

FIG. 10 is a block diagram of the multiplex circuit found in the general correction circuit of FIG. 7.

DESCRIPTION OF THE PREFERRED EMBODIMENT

Figure 1:
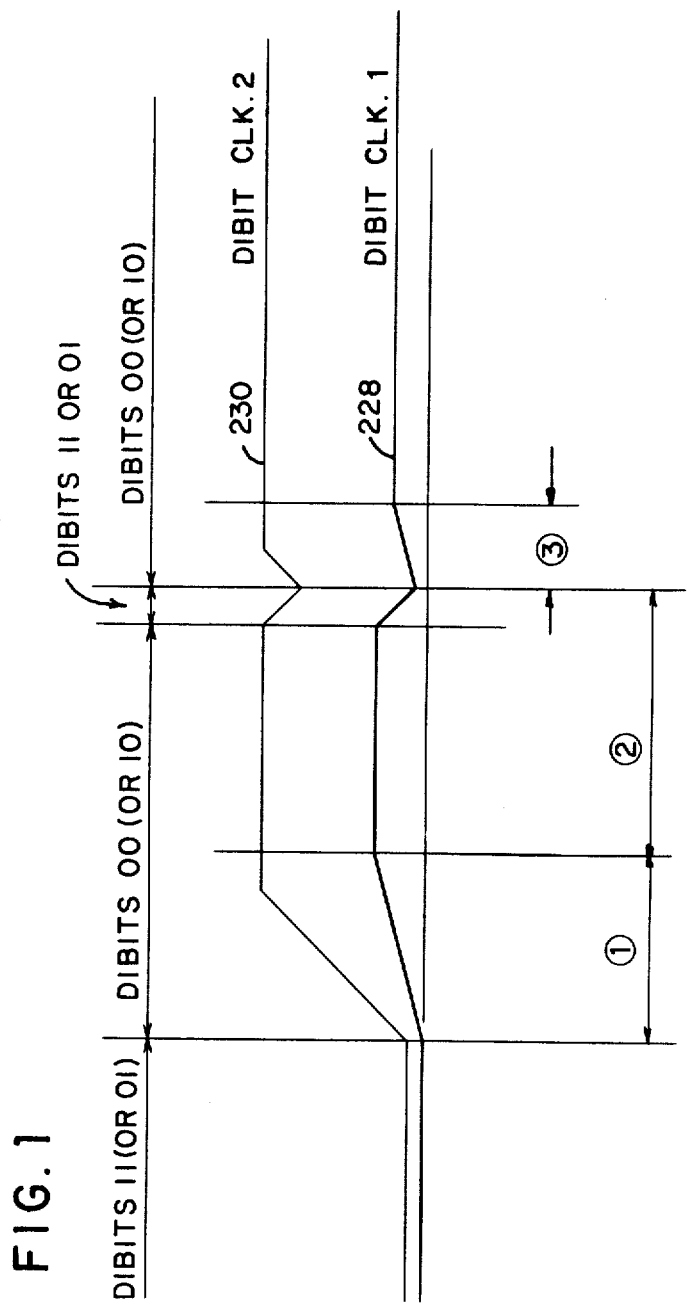
FIG. 1 is a diagram showing the phase relationship between a first dibit clock 1 and second dibit clock 2 with respect to the transmission of the dibits.

In synchronous, differentially coherent four phase modulation systems, the serial data to be transmitted is arbitrarily grouped into pairs of binary bits or dibits. During transmission, each pair of bits will cause a carrier to be altered, such that during a specific interval, the carrier signal will undergo one of four precise phase changes. As fully disclosed in the previously-cited U.S. Application Ser. No. 129,797, of Jansen et al., which application is fully incorporated in the present disclosure by reference, the carrier signal will undergo a phase change of plus 45 degrees representing the dibit 00, minus 45 degrees representing the dibit 10, plus 135 degrees representing the dibit 01 or minus 135 degrees representing the dibit 11. The binary bits which are to be transmitted are grouped into pairs at a rate of 1200 pairs per second, thereby generating a modulation interval of 1/1200 sec. In transmitting these dibit codes, each of the four possible dibit codes is associated with two frequencies which differ by 1200 Hz. representing the modulation rate. The nominal carrier center frequency is assumed to be 1800 Hz. It was found that the two dibits 00 and 10, causing frequency components at the edges of the available frequency band, were rendered less suitable in detecting the modulation interval due to the circuit quality of the band edges.

Figure 2A:
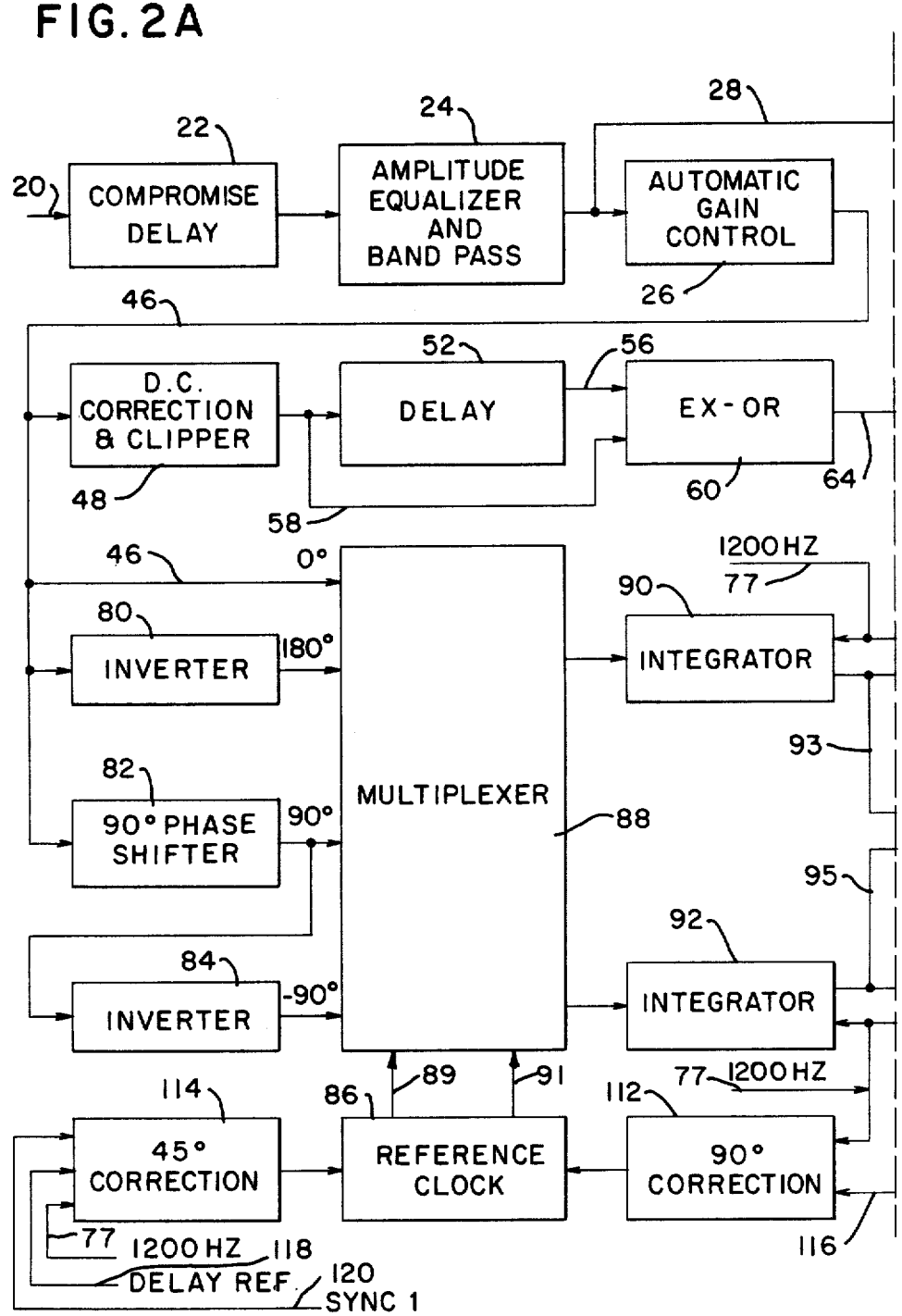
FIGS. 2A and 2B taken together form a block diagram of the demodulator apparatus embodying the present invention.
Figure 2B:
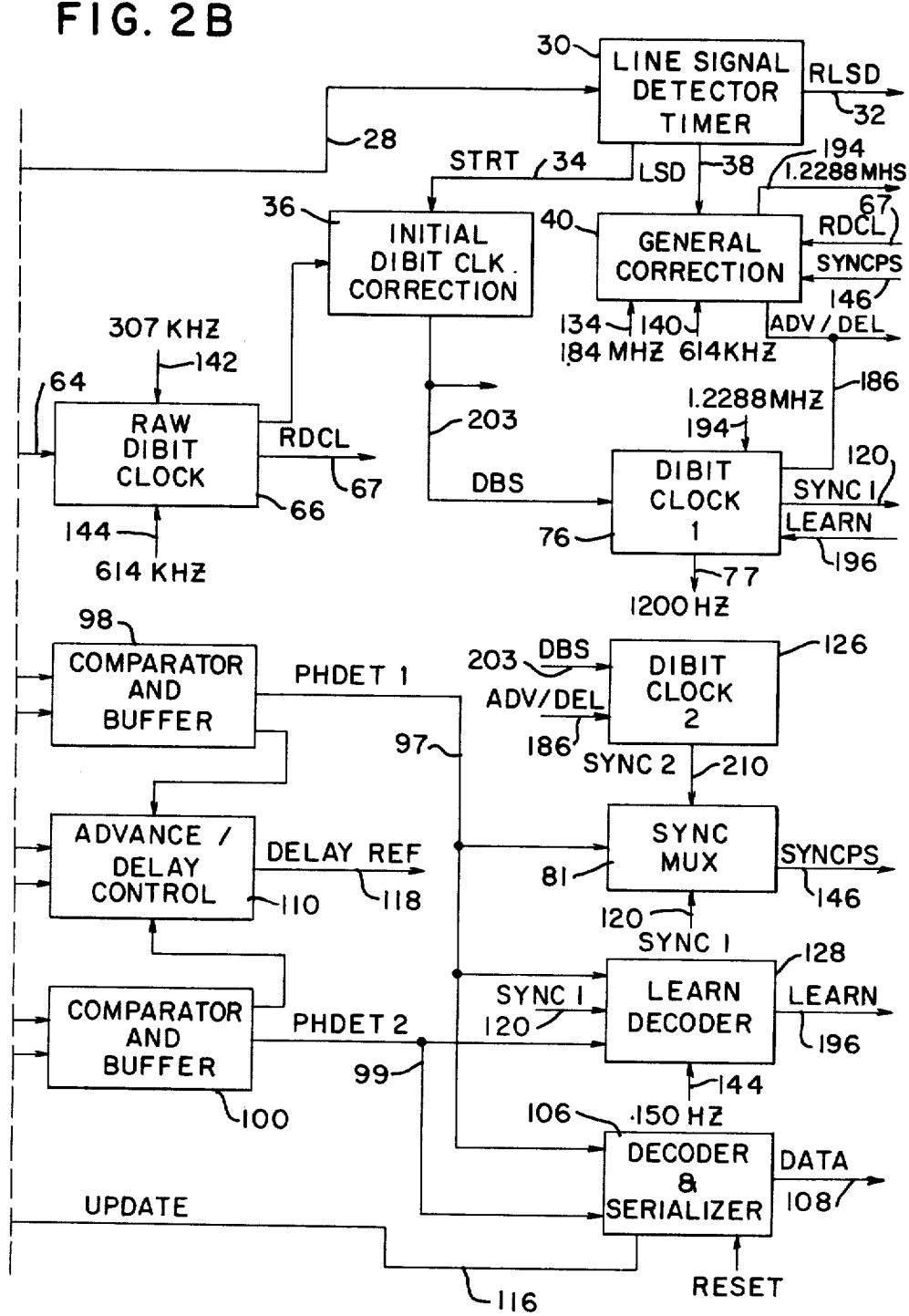

Referring now to FIGS. 2A and 2B taken together, there is disclosed a block diagram of the demodulator which embodies the present invention. In a manner that is well-known in the art, a transmitter (not shown) will output over telephone lines a series of modulated phase-shifted carrier signals which signals are transmitted over line 20 (FIG. 2A) to a compromise delay equalizer circuit 22 and an amplitude equalizer and bandpass circuit 24 which attenuates out-of-band noise and provides fixed compromise equalization of delay and amplitude distortion generated as a result of transmitting over the phone lines. The filtered circuit is then transmitted to an automatic gain control circuit (AGC) 26 to enable the receiver demodulator to optimally operate on the received signals in the range of 0 to −36 dBM without operator adjustment. The filtered signal is also transmitted over line 28 (FIGS. 2A and 2B) to a line signal detector timer 30 (FIG. 2B) which, upon sensing a signal level greater than −36 dBM, will generate a delayed signal RLSD over line 32 to a receiving terminal (not shown), a start signal STRT Over line 34 to one input of an AND gate 36 comprising an initial dibit clock correction circuit and a signal LSD over line 38 to a general correction circuit 40 whose operation will be described more fully hereinafter.

The analog signal appearing on the output of the AGC circuit 26 (FIG. 2A), is transmitted over line 46 to a dibit clock recovery circuit and a demodulation circuit. The dibit clock recovery circuit decides what constitutes a dibit period or modulation interval. In demodulating the incoming signal, the demodulator must know the period over which the phase change must be measured. This modulation interval can be obtained by making use of the fact that in every dibit interval there is a point where the apparent carrier undergoes its maximum rate of change of phase. If this point of occurrence is established, it may be used to detect the phase of the dibit clock. Once the dibit clock has been established, a time frame exists for the data demodulation operation to occur.

The normalized analog signal being outputted by the AGC circuit 26 over line 46 is passed to a DC correction and clipping circuit 48 which compensates for the variation in the average D.C. level of the signal that inherently results from the phase modulation in addition to producing a digital signal which is transmitted through a delay circuit 52 (FIG. 2A) which may comprise a shift register which delays the signal a period equal to $\frac{1}{8}$ of the dibit time. The delayed signal is compared with the digital signal appearing on line 58 in an EXCLUSIVE OR circuit 60 which generates a phase shift detect signal over line 64. This signal provides only a general indication of the dibit interval boundary as it lags the actual phase shift to a degree that depends on the particular dibit being transmitted and the phase of the carrier at the time of the shift. For examples of the waveform of the digital and the delayed signals, reference should be made to the previously-cited Jansen et al. application.

Figure 5:
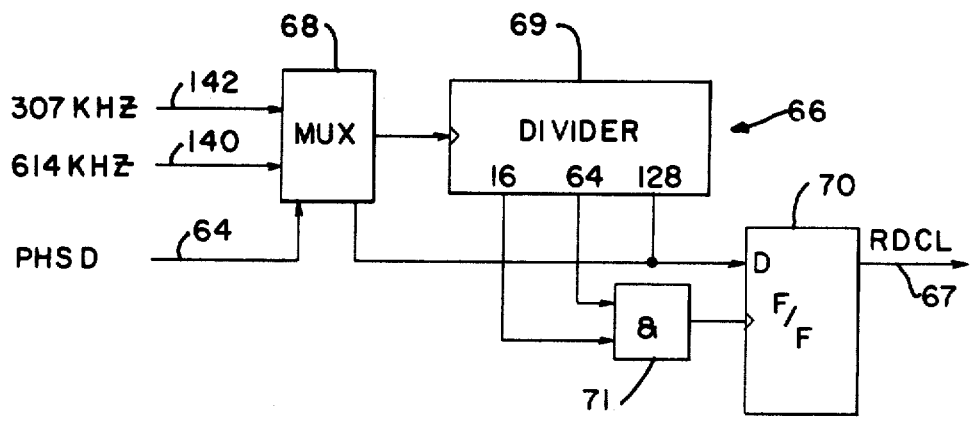
FIG. 5 is a block diagram of the phase-locked loop circuit employed as the raw dibit clock circuit in the demodulator system of FIG. 2B.

The phase shift detect signal appearing on line 64 is used to synchronize a 1200 Hz. clock generator designated as a raw dibit clock circuit 66 (FIG. 2B) which may comprise a phase-locked loop circuit (FIG. 5) including a multiplexer 68, a divider 69 and a flip-flop 70. The phase-locked loop circuit of FIG. 5 is basically an oscillator with a nominal frequency of 1200 Hz. obtained by dividing the input frequency of 307 KHz. by 256. The phase of this square-wave oscillator is corrected so that the negative going edge of the raw dibit clock (RDCL) output signal of the flip-flop 70 appearing on line 67 indicates the moment when the phase shift in the received analog signal is supposed to occur. The divider 69 is a binary counter which outputs the desired frequency at certain counter output stages in a manner that is well-known in the art. In the present instance, at the 128th stage of the divider 69, the divider outputs 1200 Hz. signals. If the rising edge of the output signal RDCL appears too early or too late with respect to the low periods on the phase shift detect output signal appearing on line 64 (FIG. 2B), the operation of the divider 69 is adjusted to overcome this deficiency. It is found that arbitrarily delaying the RDCL signal by 250 microseconds gives the best result in demodulating the incoming carrier signal. This delay is realized by gating the 16 and 64 stages of the divider 69 (FIG. 5) through the AND gate 71 to the clock input of the flip-flop 70 for clocking the 1200 Hz. RDCL signal over the output line 67.

The raw dibit clock signal RDCL contains much jitter due to the influence of the outputs of the signal PHSD. In order to overcome this condition, a first dibit clock generator 76 (FIG. 2B), is utilized to output the actual receiver dibit clock signal of 1200 Hz. which is slowly adjusted to the average phase position of the raw dibit clock signal RDCL by correction signals ADV/-

DEL received from a general correction signal circuit 40. The first dibit clock generator 76 comprises a phase-locked loop circuit whose construction is similar to the raw dibit clock circuit 66 disclosed in FIG. 5. The corrections are carried out in a manner that will be described more fully hereinafter at every negative going edge of the actual receiver dibit clock by adjusting the receiver dibit clock output of the dibit clock generator 76 towards the phase of the RDCL signal during a predetermined time period. During this time period, the receiver dibit clock output is advanced or delayed depending on the relative phase of the RDCL signal in a manner that is well-known in the art.

The first dibit clock generator 76 is initially set by the signal DBS outputted by the clock correction circuit 36 (FIG. 2B) as long as the signal STRT is high. The signal STRT is raised when the signal detector timer circuit 30 senses the start of the carrier signal. When the signals LSD and RLSD go high again, the signal STRT goes low and a signal SYNCPS 79 (FIGS. 3 and 4) outputted from the sync multiplexer circuit 81 (FIG. 2B) in a manner to be described more fully hereinafter, will control the correction of the receiver dibit clock signals in the dibit clock generator 76 over a relatively long period upon the arrival of the carrier signal, thus allowing large corrections to occur initially in order to quickly produce a receiver dibit clock. Subsequently, this period is shortened gradually to reduce the amount of jitter in the receiver dibit clock. As previously described, the demodulation of the incoming carrier requires the detection of the phase shift between two consecutive dibits. This is accomplished in the present embodiment by maintaining an 1800 Hz. reference clock which is updated at the end of the detection of each dibit and therefore forms a digitized copy of the carrier during the last dibit. Referring to FIG. 2A, the normalized analog signal appearing on line 46 outputted by the AGC circuit 26 is inputted into a multiplexer 88, an inverter circuit 80 and a 90 degree phase shifter circuit 82 to provide a 90 degree phase shift of the incoming signal resulting in signals being 90 degrees and 180 degrees out of phase with the signal appearing on line 46. The 90 degree shifted signal is transmitted to a second inverter circuit 84 whose negative 90 degree phase shifted output signal is compared, together with the output signal of the inverter circuit 80, the original signal and the output signal of the phase shifter circuit 82, with two versions of the 1800 Hz. reference clock that have a relative phase shift of 90 degrees. The phase shifted 1800 Hz. reference clock signals are outputted from the reference clock generator 86 and transmitted to the multiplexer 88 over lines 89 and 91 (FIG. 2A). The comparison of the signals inputted into the multiplexer 88 is carried out by two conventional integrator circuits 90 and 92 (FIG. 2A). The polarity of the signals inputted into the integrator circuits and thus that of the output signals of the circuits will vary depending on which one of the four possible phase shifts has occurred during the dibit interval. The analog output signals of the integrator circuits 90 and 92 respectively are dumped and synchronized by the negative going edges of the 1200 Hz. dibit clock signals appearing on line 77 and are outputted over lines 93 and 95 (FIG. 2A) to a pair of comparator and buffer circuits 98 and 100 (FIG. 2B) which convert the analog signals to binary logic levels and store these signals with the 1200 Hz. receiver dibit clock signals received over line 77 (FIG. 2B) from the dibit clock generator 76. The digitized output signals PHDET1 and PHDET2 appearing on lines 97 and 99 of the comparator circuits 98 and 100 are shown by the numerical designation 102 and 104 in FIG. 4. The binary state of each of the signals 102 and 104 for each dibit is shown in the following table:

TABLE I

| DIBIT | PHDET1 | PHDET2 |
|-------|--------|--------|
| 00 | L | L |
| 01 | H | L |
| 11 | H | H |
| 10 | L | H |

These signals are transmitted to a decoder and serializer control circuit 106 (FIG. 2B) which decodes the signals 102 and 104 in accordance with the data set out in the above table in a manner that is well-known in the art. The serial data is then outputted from the control circuit 106 over line 108 to the receiving terminal. The signals PDHET1 and PHDET2 are also transmitted to an advance/delay control circuit 110 (FIG. 2B) which detects any amplitude difference between the two incoming signals and outputs a control signal DELAY REF over line 118 to the reference clock generator 86 (FIG. 2A) in the following manner. As shown in FIG. 2A, the 1800 Hz. reference clock generator 86 is provided with two types of signals, one being a 90 degree correction signal received from the correction circuit 112 and the other a 45 degree correction signal received from the correction circuit 114. The correction circuit 112 receives over line 116 (FIGS. 2A and 2B) from the decoder and serializer circuit 106 the signal UPDATE which advances the clock phase over 1, 2, 3 or 4 times 90 degrees in accordance with the phase of the dibit decoded by the circuit 106 enabling the demodulator to decode the next dibit. The 45 degree correction circuit 114 receives in addition to the 1200 Hz. receiver dibit clock signals over line 77, the signal DELAY REF outputted from the advance/delay control circuit 110 (FIG. 2B) over the line 118 and the signal SYNC 1 received over line 120 from the first dibit clock generator 76 (FIG. 2B) which synchronizes the delaying of the phase of the 1800 Hz. reference clock by 45 degress, thereby correcting any phase deviation due to the occurrence of the frequency shift in the telephone carrier signal. The corrections taking care of the frequency shift are carried out by controlling the effective length of the signal DELAY REF which depends on the result of the amplitude comparison and the value of the received dibit. As shown in FIG. 2B, included in the demodulator is a second dibit clock generator 126 and a learn decoder 128 which controls the operation of the first dibit clock generator 76 in a manner that will now be described.

Figure 6:
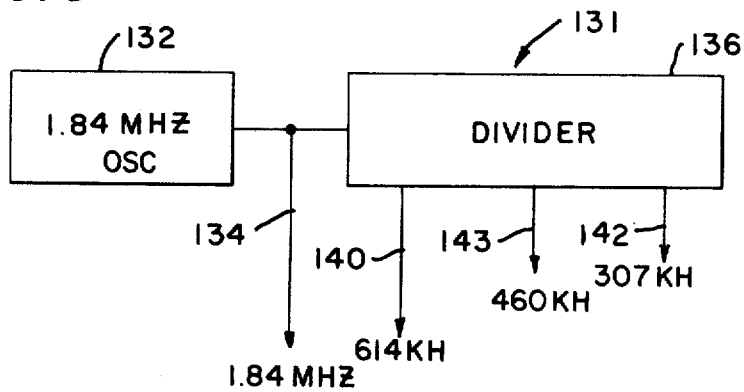
FIG. 6 is a block diagram of the oscillator for generating the clock pulses used in the demodulator apparatus.
Figure 7:
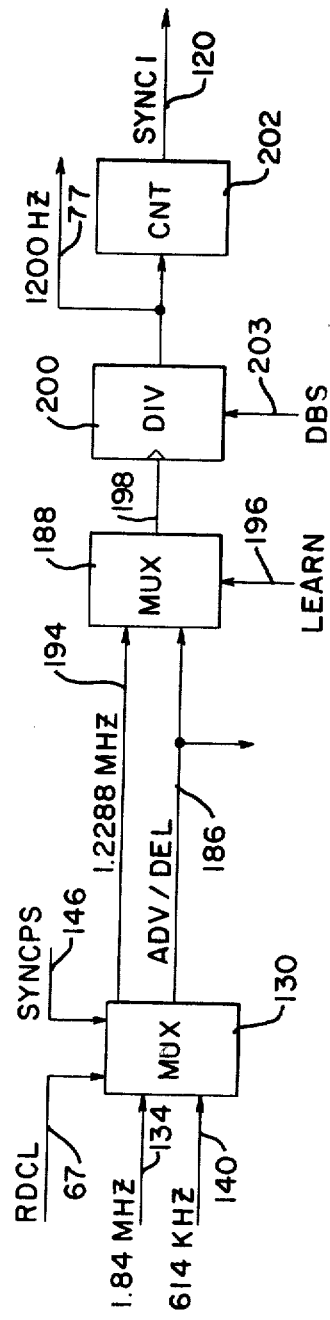
FIG. 7 is a block diagram of the general correction circuit of FIG. 2B and the suppress correction circuit and the phase-locked loop circuit employed as the first dibit clock circuit in the demodulator system of FIG. 2B.

Referring now to FIG. 7, there is shown a block diagram of the first dibit clock generator circuit 76 (FIG. 2B) and the general correction circuit 40. Included in the general correction circuit 40 is a multiplexer 130 which receives over line 67 the 1200 Hz. raw dibit clock signal RDCL from the dibit clock circuit 66 (FIG. 2B) and a 614 KHz. clock from a clock generator generally indicated by the numeral 131 (FIG. 6). The clock generator 131 comprises a 1.84 MHz. oscillator 132 outputting 1.84 MHz. clock pulses 133 (FIG. 3) over line 134 to a divider 136 which outputs the 614 KHz. clock pulses 138 (FIG. 3) over line 140, 307 KHz. clock pulses over line 142 and 150 KHz. signals over line 144.

Figure 3:
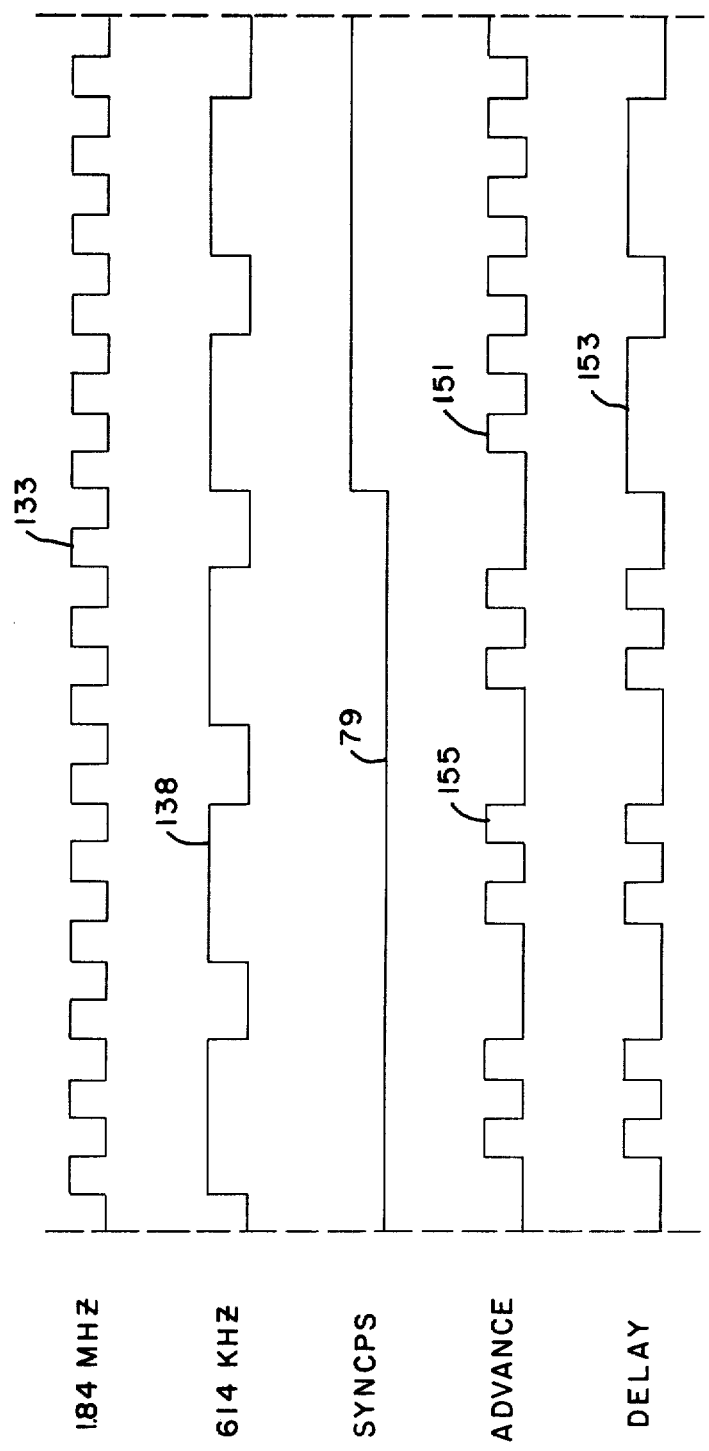
FIG. 3 is a waveform diagram showing the signals associated with the first dibit clock circuit of FIG. 7.

The multiplexer 130 (FIGS. 7 and 10) receives the 1200 Hz. clock signals RDCL over line 67 and the sync signal SYNCPS 79 (FIG. 3) over line 146. As will be described more fully hereinafter, the signal SYNCPS 79 (FIG. 4) will comprise the signal 148 (SYNC 1) FIG. 4) when the dibits 11 or 01 are being decoded and the signal 149 (SYNC 2) when the dibits 00 or 10 are being decoded. Depending on the phase of the signal SYNCPS 79 and the phase of the signal RDCL appearing on line 67, the multiplexer 130 will output over line 186 correction clock signals ADV/DEL used in correcting the phase of the 1200 Hz. signal of the dibit clock generator 76 in accordance with the dibit received. As shown in FIG. 3, upon the signal SYNCPS going high, the correction signal ADV/DEL may comprise the 1.84 MHz. clock signal 151 (FIG. 3) which will advance the frequency of the 1200 Hz. dibit clock signal when the dibit clock phase is late or the 614 KHz. clock signals 153 (FIG. 3) which will delay the 1200 Hz. dibit clock signal when the dibit clock phase is earlier enabling the phase of the output clock signals of the dibit clocks generators 76 and 126 (FIG. 2B) to be adjusted to the phase of the 1200 Hz. raw dibit clock signal RDCL appearing on line 67. When the signal SYNCPS 79 is low (FIG. 3), the ADV/DEV signal comprises a 1.2288 MHz. clock signal 155 (FIG. 3) which is derived from the clock signal appearing on the input lines to the multiplexer 130 (FIG. 7).

As shown in FIG. 10, the multiplexer 130 includes a pair of NAND gates 150 and 152, which are enabled by the SYNCPS signal 79 (FIG. 4) appearing on line 146 to output over line 156 the 1200 Hz. clock signal RDCL for a duration equal to the width of the SYNCPS signal 79. As previously described, the width of the signal SYNCPS (FIG. 4) is based on the dibit being received. A similar inverted signal is outputted over line 158 of the NAND gate 152 which receives the inverted RDCL clock signal over line 160 from the inverter 162.

The output signals of the NAND gates 150 and 152 are inputted into the clocked-data input of a pair of D-type flip-flops 164 and 166, which are clocked by the 1.84 MHz. clock signals 133 (FIG. 4) appearing on line 134. The flip-flops 164 and 166 are toggled to output a clock signal over lines 168 and 170 respectively. The flip-flop 166 is reset by the inverted 614 KHz. clock signal 138 (FIG. 3) and transmitted from the inverter 172 while the flip-flop 164 is toggled by the inverted 1.84 MHz. clock signal transmitted from the inverter 171. The output signal appearing on line 168 is inputted into a NAND gate 174 which is ANDed with the 1.84 MHz. clock signal appearing on line 134 to output clock signals over line 176 to the AND gate 178 which also receives the output signals of the flip-flop 166 transmitted through a NAND gate 180 which forms a delay to compensate for the delay formed by NAND gate 174. The signal appearing on the input line 184 of the NAND gate 180 is transmitted over line 184 to the NAND gate 178 which outputs the ADV/DEL correction signals comprising either signal 151 or 153 (FIG. 3) over line 186 to the multiplexer 188 (FIG. 7) which is part of the phase-locked loop circuit comprising the dibit clock generator 76 (FIG. 2B). As seen in FIG. 10, the 614 KHz. clock signals 138 (FIG. 3) appearing on line 140 are inputted into the inverted inputs of an AND gate 190 which also receives the 1.84 MHz. clock signals over line 134. The resulting 1.2288 MHz. clock signals of gate 190 are transmitted through the NAND gate 192 and over line 194 to the other input of the multiplexer 188. As will be described more fully hereinafter, a signal LEARN appearing on line 196 (FIG. 7) will select either the ADV/DEL correction signals appearing on line 186 or the 1.2288 MHz. signals appearing on line 194 for transmission over line 198 to a divider 200 comprising a counter which is tapped to output the 1200 Hz. dibit clock signal over line 77 (FIG. 2B). The 1200 Hz. clock signals appearing on line 77 represent the input signal to the divider 200 being divided by 1024 whose phase has been adjusted to the phase of the previous dibits 11 or 01 or the dibits 00 or 10 depending on the clock signals appearing on the input line 198 to the divider. The 1200 Hz. clock signals appearing on line 77 are outputted into a counter 202 which outputs the SYNC 1 signal 148 (FIG. 4) over line 120 in a manner that is well-known in the art.

Figure 8:
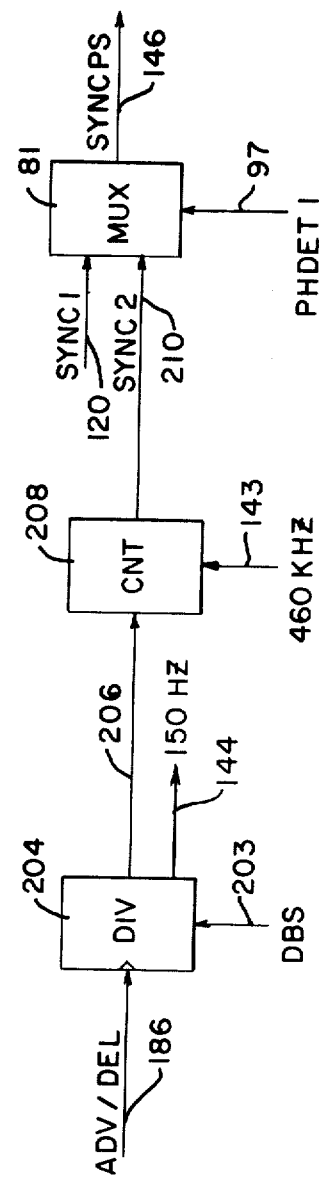
FIG. 8 is a block diagram of the phase-locked loop circuit employed as the second dibit clock circuit and the sync multiplexer circuit used in the demodulator system of FIG. 2B.

Referring now to FIG. 8 there is shown a block diagram of the second dibit clock generator 126 (FIG. 2B) and the sync multiplexer 81. The second dibit clock generator 126 comprises a divider 204 which is similar in construction to the divider 200 (FIG. 7) of the first dibit clock generator 76 and which receives over line 186 the correction signals ADV/DEL from the multiplexer 130 for use in adjusting the phase of the output clock signals of the dibit clock generators 76 and 126 to the phase of the clock signals of the raw dibit clock 66 generator (FIG. 2B). The dibit sync signal DBS appearing on line 203 and transmitted from the AND gate 36 (FIG. 2B) resets the dividers 200 (FIG. 7) and 204 (FIG. 8) to enable rapid dibit synchronization only upon the arrival of a carrier signal.

The divider 204 functions to divide the inputted correction clock signals ADV/DEL by 1024 to generate second 1200 Hz. dibit clock signals over line 206 in addition to 150 Hz. clock signals over line 144. The temporary higher input clock signal 151 (FIG. 3) or the lower input clock signals 153 effects a forward or backward phase shift of the 1200 Hz. signal. This clock signal is inputted into a 4-bit counter 208 enabling the counter to count the 460 KHz. clock signals appearing on line 143 so as to output the SYNC 2 signal 149 (FIG. 4) over line 210 during the time the 1200 Hz. clock signals are low.

Figure 4:
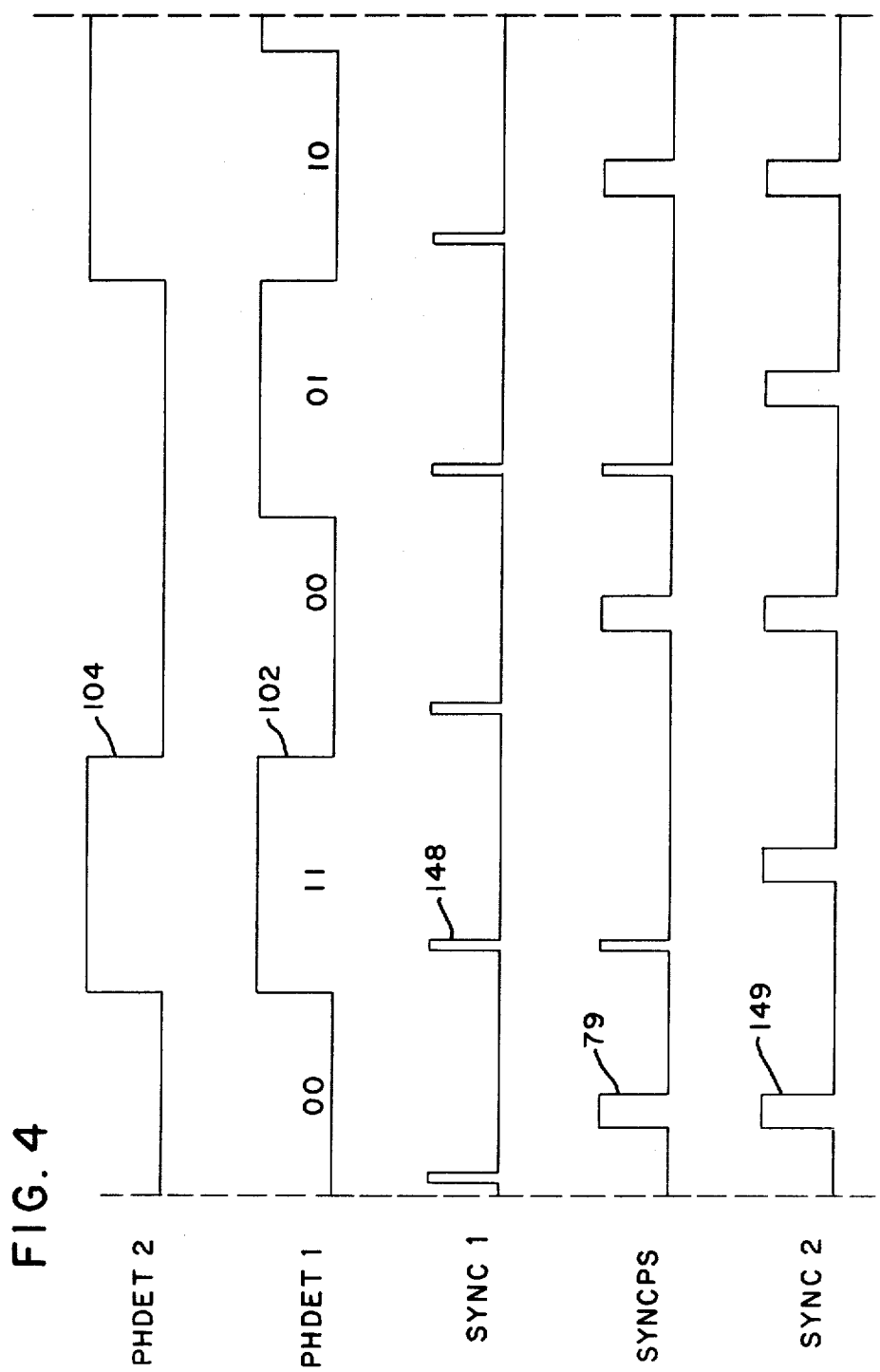
FIG. 4 is a waveform diagram showing signals generated in demodulating the incoming signal and in recovering the receiver dibit clock.

The SYNC 2 signal 149 (FIG. 4) appearing on line 210 are inputted into one input of a SYNC multiplexer 81 which receives over its other input line 120 the SYNC 1 signal 148 (FIG. 4) outputted by the counter 202 (FIG. 7). Appearing on the input line 97 to the multiplexer 81 is the phase detector signal PHDET 1 which is identified in FIG. 4 by the numeral 102. The phase detector signal 102 as shown in FIG. 4 is low during the time the dibits 00 and 10 are received. The multiplexer 81 will output the SYNC 2 signals 149 over line 146 as the signal SYNCPS 79 (FIG. 4) when the signal PHDET 1 is low and the SYNC 1 signal 148 when the signal PHDET 1 is high. The selection of the SYNC 2 signal 149 for inputting into the multiplexer 130 (FIGS. 7 and 10) enables the multiplexer to compare the current phase of the clock signals appearing on line 77 with the phase of the raw dibit clock signals appearing on line 67 to generate the correction signals ADV/DEL over line 186 enabling the dibit clock generators 76 and 126 (FIG. 2B) to adjust the phase of their output clock signals to that of the raw dibit clock signals.

Figure 9:
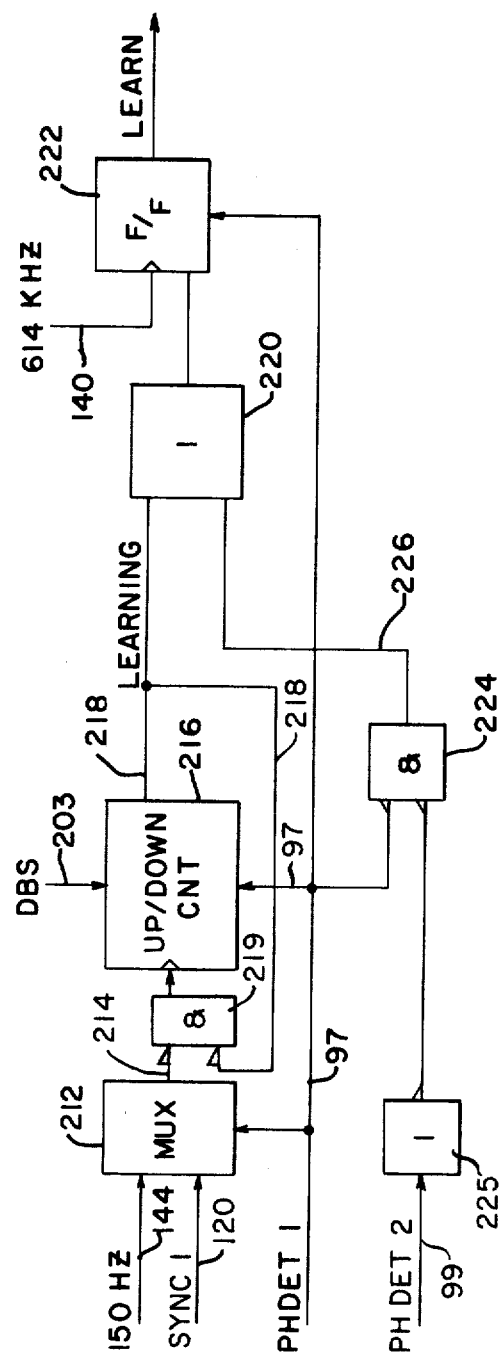
FIG. 9 is a block diagram of the learn decoder circuit used in the demodulator system of FIG. 2B.

Referring to FIG. 9 which illustrates the present invention, there is shown a block diagram of the LEARN decoder 128 (FIG. 2B) which outputs the signal LEARN for controlling the time the correction signals ADV/DEL are applied to the first dibit clock generator 76. Included in the circuit is a multiplexer 212 which receives 150 Hz. clock signals over line 144 from the divider 204 (FIG. 8) and SYNC 1 clock signals over line 120 from the first dibit clock generator 76. The SYNC 1 signals represent the 1200 Hz. clock signals. The multiplexer 212 also receives the phase detector signal PHDET 1 (FIG. 4) over line 97 from the comparator 98 (FIG. 2B). As previously disclosed, the signal PHDET 1 is low when the dibits 00 or 10 are being received and high when the dibits 11 or 01 are being received. When the signal PHDET1 is low, the multiplexer 212 will output the 150 Hz. clock signals over line 214 to the clock input of an up-down 4-bit counter 216, while the multiplexer 212 will output the 1200 Hz. clock signals when the signal PHDET1 is high. The counter 216 is preset at a count of 15 and will output a signal "LEARNING" over line 218 at the counts of 15 and 0 which is low. The signal "LEARNING" is high during the operation of the counter 216 in counting in either direction. The operation of the counter 216 is stopped at the count of 0 or 15 as a result of the output signal of an AND gate 219 going high as a result of the signal "LEARNING" appearing on line 218 which is connected to one of the inverted inputs of the AND gate 219. The counter 216 will be enabled when the level of the signal PHDET1 appearing on the counter input line 97 reverses. When this occurs, the counter 216 is incremented by the 1200 Hz. clock signals for each 11 or 01 dibit received and decremented by the 150 Hz. clock signals for each 00 or 10 dibit received. Since the clock period for the 150 Hz. clock signal lasts eight dibit times, a string of 120 of the 00 or 10 dibits must be received before the counter reaches a count of 0, at which time, upon the arrival of the next 00 or 10 dibit, the carry-out signal of the counter will become active low and a signal LEARNING appearing on the output line 218 of the counter 216 will become an active low. This signal is transmitted to an OR circuit 220 whose output signal LEARN will become inactive low. The signal LEARN is synchronized with the 614 KHz. clock signals appearing on line 140 and which are inputted into the clock input of a flip-flop 222 which outputs the low signal LEARN over line 196 to the multiplexer 188 (FIG. 7). The low signal LEARN enables the multiplexer to output the correction signals ADV/DEL to the divider 200 of the first dibit clock 76 resulting in the phase of the output clock signal of the dibit clock generator 76 being adjusted to the phase of the raw dibit clock signal in accordance with the dibit being received. Also included in the circuit of FIG. 9 is an AND gate 224 having inverted inputs and whose output line 226 is connected to the other input of the OR circuit 220. The signal PHDET1 and the inverted signal of the PHDET2 signal transmitted over line 99 and through the inverter 225 are inputted into the AND gate 224 to enable the gate 220 to output a high level signal when a dibit 10 is decoded.

Referring now to FIG. 1, there is shown a diagram of the phase relationship between the clock signal of the first dibit clock generator 76 represented by line 228 and the clock signal of the second dibit clock generator 126 (FIG. 2B) represented by line 230. Prior to receiving the dibits 00 or 10, both dibit clock signals receive the correction signal ADV/DEL (FIGS. 7 and 8) since the signal LEARN appearing on line 196 to the multiplexer 188 is low. When the first 00 or 10 dibit is received, the signal LEARN is switched to an active high enabling the multiplexer 188 to output the 1.2288 MHz. clock signals to the first dibit clock generator 76 (FIG. 2B), thereby removing the corrections to the dibit clock. During this initial learning period indicated by the numeral (1) in FIG. 1, the second dibit clock signals 230 still receives the correction signals ADV/DEL over line 186 (FIG. 8). After receiving a string of 120 of the dibits 00, the signal LEARN becomes low, enabling the multiplexer 188 to output the correction signals ADV/DEL to the first dibit clock generator 76. As a result, both dibit clock generators receive the same corrections during the time (2) the dibits 00 are received. After receiving a few of the dibits 11 or 01, a short relearning period (3) occurs before both dibit clock generators are again receiving the same correction signals.

Numerous modifications and adaptions of the system of the present invention will be apparent to those skilled in the art and thus it is intended by the appended claims to cover all such modifications and adaptations which fall within the true spirit and scope of this invention.

I claim:

1. In a differentially encoded phase-modulated data transmission system in which a carrier signal is phase-shifted over a data interval at a modulation rate to represent one of a plurality of pairs of data bits for transmission to a receiver, a demodulator apparatus for decoding the transmitted pairs of data bits comprising:

means for detecting the start of each data interval in the received carrier signal;

means for generating first clock pulses in response to the detecting of said data intervals;

means for generating second clock pulses having the same phase as said first clock pulses in response to the generation of said first clock pulses;

means for decoding the carrier signal to derive first control signals representing a first predetermined pair of data bits in response to receiving said second clock pulses;

means coupled to said second clock pulse generating means for outputting to said second clock pulse generating means third clock pulses adjusted to the phase of the first clock pulses;

means operated in response to the generation of said first control signals for disabling the transmission of said third clock pulses to said second clock pulse generating means;

and means coupled to said decoding means and said disabling means for counting the number of said first control signals generated by said decoding means, said counting means disabling the operation of said disabling means upon reaching a predetermined count whereby said third clock pulses are transmitted to said second clock pulse generating means.

2. The demodulator apparatus of claim 1 in which said counting means includes:

a counter member;

a source of fourth clock pulses; and means coupled to said source of fourth clock pulses and said decoding means for transmitting said fourth clock pulses to said counter member in response to the generation of said first control signals whereby said counter member will output a second control signal in response to the counter member reaching a predetermined count.

3. The demodulator apparatus of claim 2 in which said counter member comprises an up/down counter set at a predetermined count and operated by said fourth clock pulses to count in a downward direction to reach said predetermined count in response to the generation of said first control signals.

4. The demodulator apparatus of claim 2 in which said disabling means includes logic circuit means coupled to said counter member and operated in response to receiving said second control signal for disabling the operation of said disabling means whereby said third clock pulse generating means will transmit said third clock pulses to said second clock pulse generating means.

5. The demodulator apparatus of claim 4 which further includes:

means coupled to said third clock pulse generating means for generating a plurality of fifth clock pulses in response to the generation of said third clock pulse;

first means connected to said fifth clock pulse generating means for generating a first variable-length control signal in response to receiving said fifth clock pulses;

second means connected to said second clock pulse generating means for generating a second variable-length control signal in response to receiving said second clock pulses;

and switching means coupled to said third clock pulse generating means and said decoding means for transmitting either of said first or second variable-length control signals to said third clock pulse generating means in response to the generation of said first or second variable-length control signals whereby said third clock pulse generating means will generate said third clock pulses adjusted to the phase of said first clock pulses in accordance with the variable-length control signals transmitted by said switching means.

6. In a differentially encoded phase-modulation data transmission system in which a carrier signal is phase-shifted over a data interval at a modulation rate to represent a pair of data bits for transmission to a receiver, a demodulator apparatus in the receiver for decoding the transmitted data comprising:

means responsive to receiving said carrier signal for generating a first control signal representing the start of a data interval;

means for generating a first clock signal operated in response to receiving said first control signal;

means for generating a second clock signal having the same phase as said first clock signal in response to the generation of said first control signal;

means coupled to said second clock signal generating means for decoding the carrier signal to derive second and third control signals representing a perdetermined pair of data bits in response to receiving said second clock pulses;

means coupled to said first clock signal generating means for outputting third clock signals adjusted to the phase of said first clock signals;

a source of fourth clock signals;

first switching means connected to said second clock signal generating means and receiving said third and fourth clock signals and operated to output either of said third or fourth clock signals to said second clock generating means;

means coupled to said first switching means and responsive to the generation of said second and third control signals for operating said switching means to output said fourth clock signals to said second clock signal generating means;

and means coupled to said operating means for counting the number of said predetermined pair of data bits decoded by said decoding means, said counter means controlling said operating means upon reaching a predetermined count whereby said first switching means outputs said third clock signals to said second clock signal generating means.

7. The demodulator apparatus of claim 6 in which said counter means includes a counter member, said apparatus further including second switching means coupled to said decoding means and said counter member and adapted to operate said counter member upon the generation of said second control signal whereby said counter member is operated to count the occurrences of said second control signal.

8. The demodulator apparatus of claim 7 in which said counter member comprises an up/down counter, said demodulator apparatus further including a source of fifth clock signals for operating said counter member in a direction to reach said predetermined count, said second switching means coupled to said source of said fifth clock signals and operated by said second control signals to output said fifth clock signals to operate said counter member in a direction to reach said predetermined count.

9. The demodulator apparatus of claim 8 in which said counter member outputs a fourth control signal upon reaching said predetermined count and said operating means includes gating means coupled to said counter member and said decoding means for receiving said second, third and fourth control signals for outputting a fifth control signal to said first switching means, enabling said first switching means to output said fourth clock signals to said second clock signal generating means.

10. The demodulator apparatus of claim 9 which includes:

means for generating sixth clock signals in response to the generation of said third clock signals;

second counter means connected to said second clock signal generating means for outputting a first variable-length control signal;

third counter means coupled to the output of said sixth clock generating means for outputting a second variable-length control signal in response to the generation of said sixth clock signals;

and third switching means coupled to said second and third counter means and operated by said second control signal to output said second variable-length control signal to said third clock outputting means wherein the third clock signals are generated in response to receiving said second variable-length control signals.

11. A method for synchronizing the demodulation of a differentially-encoded phase-modulated carrier signal in which the carrier signal is phase-shifted over a data interval to represent one of a plurality of pairs of data bits comprising the steps of:

detecting the start of a data interval in the carrier signal;

generating a first clock pulse representing the data interval upon detecting the start of the data interval;

generating a second clock pulse representing approximately the data interval;

adjusting the phase of the second clock pulse to the phase of the first clock pulse;

demodulating the carrier signal in accordance with the phase of the second clock pulse to generate a first control signal representing a predetermined pair of data bits;

disabling the adjusting step upon the generation of said first control signal;

generating a predetermined count of the occurrences of said first control signals;

and adjusting the phase of the second clock pulse to the phase of the first clock pulses (at the occurrence of each of said first control signals) upon the generation of said predetermined count.

12. The method of claim 11 in which the adjusting step further includes the steps of:

generating a third clock signal;

generating a first variable-length signal upon the occurrence of said second clock signals;

generating a second variable-length signal upon the occurrence of said third clock signals;

and adjusting the phase of the second clock signals to the phase of the first clock signals during the time said first and second variable-length signals are generated.

* * * * *